United States Patent [19]

Aberle et al.

[11] 4,249,241

[45] Feb. 3, 1981

[54] OBJECT ACCESS SERIALIZATION APPARATUS FOR A DATA PROCESSING SYSTEM

[75] Inventors: Gary F. Aberle; Gerald J. Balm; Viktors Berstis; Leon E. Gregg; Kuang-Chi Hu; James G. Ranweiler; William C. Richardson; Terry L. Schardt; Charles T. Watson, all of Rochester, Minn.

[73] Assignee: International Business Machines Corporation, Rochester, Minn.

[21] Appl. No.: 953,669

[22] Filed: Oct. 23, 1978

[51] Int. Cl.³ .................... G06F 15/16; G06F 9/46
[52] U.S. Cl. ................................................. 364/200
[58] Field of Search ............................... 364/200, 900

[56] References Cited

U.S. PATENT DOCUMENTS

| | | | |
|---|---|---|---|
| 3,319,226 | 5/1967 | Mott | 364/200 |
| 3,405,394 | 10/1968 | Dirac | 340/172.5 |
| 3,528,062 | 9/1970 | Lehman | 340/172.5 |
| 3,530,438 | 9/1970 | Mellen | 364/200 |
| 3,676,860 | 7/1972 | Collier | 340/172.5 |
| 3,886,525 | 5/1975 | Brown | 340/172.5 |
| 3,916,385 | 10/1975 | Parmar | 364/200 |

OTHER PUBLICATIONS

*IBM System/370 Principles of Operation;* International Business Machines Corporation, copyright 1974; pp. 38-39, 144-145.
*Structured Computer Organization,* Andrew S. Tanenbaum, pp. 242-245.
"The Michigan Terminal System", IBM, p. 116, Mar. 1977.
IBM Systems Manual "OS/VS2 Supervisor Services and Macro Instructions", VS2, Release 2.
*Operating System Principles;* Brinch Hansen; Sections 3.1, 3.3 and 3.5.

*Primary Examiner*—David L. Stewart
*Attorney, Agent, or Firm*—Kirkland & Ellis

[57] ABSTRACT

A serialization apparatus for a data processing system wherein access restrictions are automatically enforced: (1) in behalf of individual machine instructions in order to maintain object integrity; and (2) at each user's discretion in order to maintain synchronization among all concurrent users of any given object. Various types of restrictions can be enforced in behalf of both machine instructions and users, allowing concurrent access to objects at various levels where appropriate.

23 Claims, 6 Drawing Figures

| CONTROL LATCHES 100 | | | | | | | | | | | | | | | | | | |
|---|---|---|---|---|---|---|---|---|---|---|---|---|---|---|---|---|---|---|
| NULL INDICATOR | ZERO DETECT INDICATOR | COMPARE EQUAL INDICATOR | CONFLICT INDICATOR | FIRST HR INDICATOR | END OF CHAIN INDICATOR | NON ZERO RESULT INDICATOR | INFINITE WAIT LATCH | MONITOR LATCH | CONFLICT LATCH | BUSY LATCH | EOC LATCH | STORAGE LIMIT EXCEEDED LATCH | OPERATION LOCK CONFLICT LATCH | LOCK WAIT EXPIRED LATCH | LOCK DOES NOT EXIST LATCH |
| (NI) | (ZDI) | (CEI) | (CI) | (FHRI) | (EOCI) | (NZR) | | (ML) | (CL) | (BL) | (EL) | | | | |
| 101 | 102 | 103 | 104 | 105 | 106 | 107 | 108 | 112 | 113 | 114 | 115 | 116 | 117 | 118 | 119 |

FIG-6

| Hold Type | 3-Bit Hold Type Code | HREA Output (Hexadecimal) | Corresponding Binary HRBTEST | Binary HRBHOLD | Alternative Binary HRBTEST | HRBHOLD |
|---|---|---|---|---|---|---|
| LENR | 0 | F1F0 | 11110001 | 11110000 | 11111001 | 00001000 |
| LEAR | 1 | 3130 | 00110001 | 00110000 | 01111001 | 00010000 |
| LSUP | 2 | 1120 | 00010001 | 00100000 | 01011001 | 00100000 |
| LSRO | 3 | 2110 | 00100001 | 00010000 | 00111001 | 01000000 |
| LSRD | 4 | 4180 | 01000001 | 10000000 | 00001001 | 10000000 |
| Read | 5 | 4102 | 01000001 | 00000010 | 00001001 | 00000010 |
| Modify | 6 | 1301 | 00010011 | 00000001 | 01011011 | 00000001 |
| Destroy | 7 | F301 | 11110011 | 00000001 | 11111011 | 00000001 |

OBJECT ACCESS SERIALIZATION APPARATUS FOR A DATA PROCESSING SYSTEM

DESCRIPTION

1. Technical Field

This invention relates to stored program data processing systems, and more particularly to apparatus for serializing the access to the resources of such a data processing system.

The invention finds particular utility in stored program data processing systems configured to operate interactively with terminal operators and in stored program data processing systems having the need to execute a large number of jobs in a batch mode, such as in a large multiprogramming environment.

2. Background Art

In data processing systems which are capable of processing more than one program at a time, means must be provided to insure that two programs in the system do not simultaneously attempt conflicting operations on data or other programs in the system. The processes carried out on behalf of the user of the data processing system will hereinafter be referred to as "tasks". These tasks can include one or more programs. The programs are composed of machine "instructions" which carry out "operations" on addressable constructs referred to as "objects". Objects can include data, tasks, and programs.

Simultaneous conflicting operations are avoided by "serializing" the various tasks being performed by the system so that one task which seeks conflicting access to an object will be forced to wait until the task in progress has finished operating on the object in question.

Prior art systems which provide a serialization means utilize software implementations which are only enforced if each individual programmer chooses to check for an access restriction prior to executing an operation. These software systems consume a relatively large amount of processor time. Furthermore, even those systems which do implement access restrictions (or "holds") in software recognize no more than two levels of access to objects, with a limited ability for more than one task to share a given level of access.

In prior art systems, the only way to check for an access restriction on an object is to invoke a holding program or function and try to put a restriction on the object. Thus a hold has to be put on and removed (with a commensurate comsumption of processor time) in order to check the availability of an object, even though the user does not require a hold for his particular use.

In addition, since a programmer has to either apply a hold and/or follow other programming protocols in order to determine whether access to an object is restricted, prior art access restrictions on an object can be circumvented.

Since prior art systems do not allow multiple holds to be obtained by a single task on an object, great care has to be taken in removing prior art holds in order to insure that, in doing so, a hold imposed by some other portion of the program is not being removed as well. In addition, access restrictions generated by prior art systems are not generally traceable to the restricting user. In prior art systems, software holds are stored along with the held object, and hold status data is not centralized. This necessitates increased paging through a virtual memory system to carry out hold related operations.

DESCRIPTION OF INVENTION

The present invention provides a hardware implementation of sharable access restrictions in the form of a serialization mechanism which is available at various levels within the data processing system. The serialization mechanism in its generalized form is hereinafter referred to as "Grant/Free". Grant/Free guarantees a task a specified level of access to an object and excludes other tasks which seek conflicting access to that object. Depending on whether the access restriction is requested by a user or is automatically called by a machine instruction, the hold effected by the Grant/Free apparatus will take the form of either a "lock" or a "seize".

The Grant/Free apparatus is utilized at two levels of the data processing system. First, the Grant/Free Apparatus is utilized by the system for internal machine support. In order for the machine to preserve the integrity of each object, a mechanism is provided to insure that while one operation is being performed on an object, no other operation can modify that particular object. This protection is provided automatically and is necessarily enforced for all machine operations performed on objects with certain limited exceptions specified in the hardware. This level of the Grant/Free apparatus (i.e., an access restriction applied automatically by the machine) is hereinafter referred to as "Seize/Release". Seize/Release can be invoked on an exclusive or non-exclusive basis. The duration of a seize is limited to a single machine instruction.

Second, the Grant/Free mechanism is available at the user level and at the user's discretion, in order to maintain synchronization among all concurrent users of any given object. An access restriction applied by the user via the Grant/Free apparatus is hereinafter referred to as "Lock/Unlock". Various types of locks can be selected by the user in accordance with the degree to which the user requires exclusive access to the object. These locks can remain in effect for whatever portion of the lock-applying task the user desires. As will be discussed below, five lock types are defined in accordance with one version of the present invention. The rules governing the relationship among the five types of locks and the two types of seizes will also be discussed in detail below.

Thus, it is the principal object of the present invention to provide a hardware serialization implementation which is available both for internal machine support, in order to preserve program/data integrity, and for use by each user of the machine, in order to maintain synchronization among all concurrent users of any given object.

It is a further object of the present invention to provide a serialization apparatus which is implemented automatically regardless of whether a task requesting access to an object seeks to impose an access restriction on that object.

It is a further object of the present invention to provide a serialization apparatus whereby different levels of access restriction can be imposed on objects in accordance with the level of access required to be guaranteed to one or more restricting tasks and the level of access required to be prohibited to all other tasks.

It is a further object of the present invention to provide a serialization mechanism at a hardware level not accessible to system users, so that access restrictions cannot be circumvented.

It is a further object of the present invention to provide an access restricting apparatus whereby, if a requested restriction cannot be granted due to an existing restriction, the requested restriction can automatically be permitted to wait for a selectable time interval, and whereby the user can be signalled when the existing restriction is released.

It is a further object of the present invention to permit multiple access restrictions on a single object to be obtained by the same task, to be removed by that task one at a time if desired, and to be traced to that task, so as to permit programs and subprograms to request and remove locks without affecting access restrictions imposed by other programs or subprograms.

It is a further object of the present invention to provide an access restricting apparatus which can be implemented utilizing a condensed format, so that a relatively large number of lock restrictions can be stored in a relatively small portion of memory, thus localizing the area of the memory which must be searched in order to implement access restriction related functions.

It is a further object of the present invention to provide an access restricting apparatus which can be invoked at the user's discretion against other tasks, regardless of whether those tasks seek to impose an access restriction, while requiring a minimal amount of additional processor time to implement the restriction.

These and other objects of the present invention are hereinafter presented by way of illustration and not limitation by the following detailed description of the preferred embodiment of the present invention.

BEST MODE FOR CARRYING OUT THE INVENTION

The Grant/Free apparatus of the present invention maintains object integrity by providing an internal serialization function referred to hereinafter as "Seize/Release". An instruction invoked by a task must seize an object in order to operate on it. The Grant/Free apparatus of present invention also provides an external serialization mechanism under user control referred to hereinafter as "Lock/Unlock". The Grant/Free apparatus will automatically check for conflicts (violations of the lock and seize protocols) in the course of applying a seize or a lock.

Operations which can be performed on an object may be classified according to three levels of access required to perform such operations in accordance with the preferred embodiment of the present invention ("no access" may be considered a fourth level). For convenience, these levels are referred to as "destroy", "modify", and "read". It should be noted that these terms have broader meanings than their literal definitions suggest, as hereinafter described. "Destroy" designates any type of operation which is inconsistent with the ability of any other task to read, modify, or destroy the object in question. (Note that a "destroy" type operation need not involve the literal destruction of the object in question, but could include, for example, an operation whereby the name of the object was changed so that it would no longer be accessible to other tasks). "Modify" designates any type of operation which changes the object (or a characteristic of the object), while leaving it accessible to other tasks in the system (e.g., updating). Finally, "read" designates any operation which requires access to an object but does not change it. These three categories of operations are hierarchical in that any task with the ability to destroy an object also has the ability to modify or read the object; and a task with the ability to modify an object also has the ability to read the object. While destroy is inconsistent with allowing another task to either read, modify or destroy the object in question, note that the read and modify classes of operations do not inherently exclude one another.

The basic function of the Seize/Release operation is to preserve object integrity by preventing one task from reading, modifying or destroying an object while a second task is simultaneously modifying or destroying that object. No inherent inconsistency is presented by permitting two tasks to read the same object simultaneously. In accordance with this, two types of seizes are permitted. A shared seize ("SHSZ") must be obtained by an object by any task which will only read that object. A shared seize guarantees access to read the object to the task possessing the shared seize. Another task can simultaneously obtain a shared seize to read an object while another shared seize exists with respect to that object. An exclusive seize ("EXSZ") must be obtained by any task which seeks to modify or destroy an object. When an exclusive seize is held on an object, no operation on that object may be concurrently undertaken by any other task. Thus, neither a shared seize nor an exclusive seize can be obtained by any other task while an exclusive seize is held by a task on an object. Conversely, an exclusive seize guarantees the task holding the exclusive seize uninterrupted access to the seized object. No task can obtain an exclusive seize on an object while a shared seize is already held on that object by another task, because the first task could be deprived of access if this were permitted.

Whenever a requested seize conflicts with an existing seize or lock (described in detail below) which is already held with respect to that object, the requested seize cannot be granted. Depending on the cause of the conflict, the task requesting the seize may be caused to wait, or an exception may be signalled. The resolution of such conflicts is handled automatically and is described in detail below.

These levels of operation can be combined to form sixteen different types of access restrictions which, in the present invention, are under user control, wherein one of the four access levels (i.e., destroy, modify, read, or no access) is to be guaranteed to the particular task, and one of the four levels of access is to be permitted to any other task. These user-controlled access restrictions are referred to hereinafter as "locks". These combinations are shown in the following table.

TABLE 1

| Lock Type | Operations Guaranteed To This Task | Operations Permitted to Other Tasks |
|---|---|---|
| 1 | read, modify, destroy | read, modify, destroy |
| 2 | read, modify, destroy | read, modify |
| 3 | read, modify, destroy | read |
| 4 | read, modify, destroy | none |
| 5 | read, modify | read, modify, destroy |
| 6 | read, modify | read, modify |
| 7 | read, modify | read |
| 8 | read, modify | none |
| 9 | read | read, modify, destroy |
| 10 | read | read, modify |
| 11 | read | read |
| 12 | read | none |
| 13 | none | read, modify, destroy |
| 14 | none | read, modify |
| 15 | none | read |
| 16 | none | none |

In accordance with the way that the read, modify and destroy functions have been defined, 11 of the 16 combinations can be eliminated, since they do not represent meaningful combinations of guaranteed access and exclusion. In particular: lock types 1, 2, and 3 may be eliminated, since, if the task in question is to be guaranteed the ability to destroy the object in question, no other task can be permitted to read, modify or destroy the object; lock types 5 and 9 can be eliminated since if the task in question is to be guaranteed the ability to read the object in question, no other task can be permitted to destroy that object; lock types 8 and 12 can be eliminated since, if no access is to be permitted to any other task, then guaranteeing either read and modify access (type 8), or read access alone (type 12), is equivalent to destroy access, and is therefore, in effect, a subset of lock type 4; and finally, lock types 13, 14, 15 and 16 can be eliminated since, if no operations are guaranteed to the task in question, there is no access restriction in effect.

Thus, five unique lock types, corresponding to lock types 4, 6, 7, 10, and 11 shown in Table 1, can be defined for three levels of operation upon objects, where two of these levels can be shared simultaneously by more than one task. These locks, which are under the user's control, are designated as follows:

LOCK EXCLUSIVE NO READ (LENR)—A task possessing this type of lock possesses total control over the object in question. No other task may operate on the object while this lock is in place. The object may be read, modified, and/or destroyed without conflict by the task holding this lock. This lock may not be granted to a task if any other task holds any type of lock or seize on the object.

LOCK EXCLUSIVE ALLOW READ (LEAR)— This lock guarantees to the task holding it, access to the object to read or modify the object at any time, and further guarantees that no other task can modify or destroy the object while this lock is in effect. This lock may not be granted if any other task holds either a LENR, LEAR, LSUP, or LSRO lock, or an exclusive seize on the object.

LOCK SHARED UPDATE (LSUP)—This lock guarantees the task holding it access to the object in question to read or modify the object at any time. Other tasks may obtain simultaneous access to read or modify the object, but no other task may destroy the object. This lock may not be granted if any other task holds either a LENR, LEAR, or LSRO lock or an exclusive seize on the object in question.

LOCK SHARED READ ONLY (LSRO)—This lock guarantees the task access to the object to read it at any time. Other tasks may obtain simultaneous access to read the object, but no other task may modify or destroy the object. This lock may not be granted if any other task holds a LENR, LEAR, or LSUP lock or an exclusive seize on the object in question.

LOCK SHARED READ (LSRD)—This lock guarantees the task in question access to read the object at any time. Other tasks may have simultaneous access to the object to ready or modify it, but no other task may destroy the object while this lock is in place. This lock may not be granted if any other task holds a LENR lock or an exclusive seize on the object. The properties of the various lock types may be summarized in tabular form as follows:

TABLE 2

| Lock Type | No Other Task May Have Any of These Lock Types | Operations Guaranteed To This Task | Operations Permitted To Other Tasks |
|---|---|---|---|
| LENR | LENR LEAR LSUP LSRO LSRD | read, modify, destroy | none |
| LEAR | LENR LEAR LSUP LSRO | read, modify | read |
| LSUP | LENR LEAR          LSRO | read, modify | read, modify |
| LSRO | LENR LEAR LSUP | read | read |
| LSRD | LENR | read | read, modify |

There are two types of seize, exclusive and non-exclusive, and the exclusive seize can be implemented in two ways depending on whether the instruction obtaining the seize is a modify instruction or a destroy instruction. If a lock is in place on an object of a type which allows that object to be modified, then the seize and lock protocols as implemented through the hold request block test byte described in detail below, will permit an exclusive seize to be granted for a modify instruction since this would not conflict with the existing lock. However, if a destroy instruction requests an exclusive seize in this situation, it would not be granted since the destruction of the object would destroy the access of the process holding the lock. This is accomplished by utilizing different hold request block test bytes to implement exclusive seizes generated by modify and destroy instructions, while using the same hold request block hold byte. Thus, there are three types of hold associated with seize access restrictions. The manner in which these protocols are implemented will be more fully described below.

The three hold types associated with seize access restrictions combine with the five hold types associated with lock access restrictions to yield eight unique hold types which are implemented in accordance with the preferred embodiment of the present invention.

Each machine instruction which operates on an object (other than an instruction to lock or unlock an object) signals the "Grant Hold" function of the Grant/Free apparatus to seize the object (as described in detail below) in order to determine whether the operation to be performed is allowable under whatever access restrictions are in effect for the object to be operated upon. When the machine instruction is carried out, the address of the object to be operated upon (the "operand"), and a 3-bit hold type code are input to the Grant Hold function of the Grant/Free apparatus. The value of the hold type code is predetermined based on the type of operation to be performed on the operand. If a read operation is to be performed, a hold type code value of 5 will be specified; if a modify operation is to be performed, a hold type code value of 6 will be specified; and if a destroy operation is to be performed, a hold type code of 7 will be specified as input to the Grant Hold function.

The Grant Hold function will then indicate either a continuation of the instruction, or termination via an operation lock conflict exception. An operation lock conflict exception indicates that the requested seize could not be granted due to a conflicting pre-existing lock on the object. In the case of continuation (in a machine instruction other than a lock or unlock instruction) the operation to be performed is carried out on the object. Then, the Free Hold function of the Grant/Free apparatus is invoked to indicate that the operation has been completed and to remove the seize restriction placed on the object.

The machine lock instruction and the machine unlock instruction differ from other types of machine instructions in that the user of the machine instruction specifies the hold type code as an input operand to the instruction. Further, the machine lock instruction does not invoke any other functions. The hold type code designates the type of lock to be applied to the object in behalf of the process issuing the lock instruction, with LENR, LEAR, LSUP, LSRO, and LSRD being designated by hold types codes 0 through 4, respectively. As with other types of machine instructions, the address of the object to be operated upon is read in with the instruction. If the requested lock cannot be granted immediately, the Grant Hold function of the Grant/Free apparatus will permit the task requesting the lock to "wait" for a selectable amount of time until either the lock is granted or the time limit has expired. If a continuation is signalled, the requested lock has been granted and the operation is complete.

Figure 1:
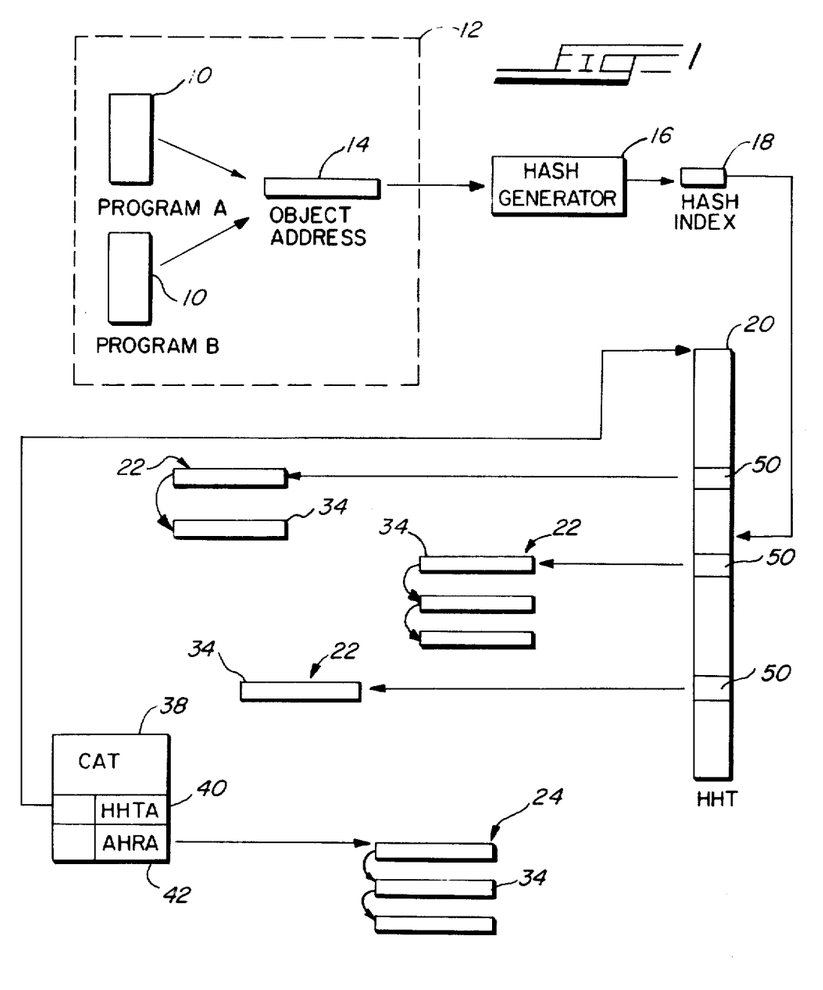
FIG. 1 is a schematic diagram illustrating the present invention.

With reference to FIG. 1, the invention is illustrated by way of example as being incorporated in a stored program computer system, wherein one or more programs 10 may be grouped into a task 12 which operates on one or more objects (not shown). Every program 10 within task 12 would use the object address 14 in its respective instruction stream. The object address 14 is operated on by a hash generator 16 which utilizes a hashing algorithm to produce a hashed address or hash index 18 that is shorter in length than object address 14. Hash index 18 references a particular hold hash table entry (HHTE) 50 in the hold hash table (HHT) 20. The HHTE 50 in HHT 20 contains an address to a hold record chain 22 containing the current hold activity for the object located at object address 14. Hold record chain 22 also contains the current hold activity for all hash synonyms; i.e., different object addresses 14 for which the hash generator 16 produces the same hash index 18. Each HHTE 50 either contains an address to a hold record chain 22 or a zero value; i.e., a null indication meaning that there is no current hold activity for the object and its hash synonyms (hereinafter referred to as the "hash synonym group"). Thus, each hold record chain 22 contains all the current hold record 34 activity for the particular hash synonym group for all active tasks 12 in the system. A chain of available hold records 24, from which new hold records 34 are drawn and to which freed hold records 34 are returned, is initialized.

The control address table (CAT) 38 is a table which all tasks 12 may access. The CAT 38 contains the hold hash table address (HHTA) 40 of the start of HHT 20 and the available hold record address (AHRA) 42 of the first available hold record remaining in the available hold record chain 24.

Figure 2:
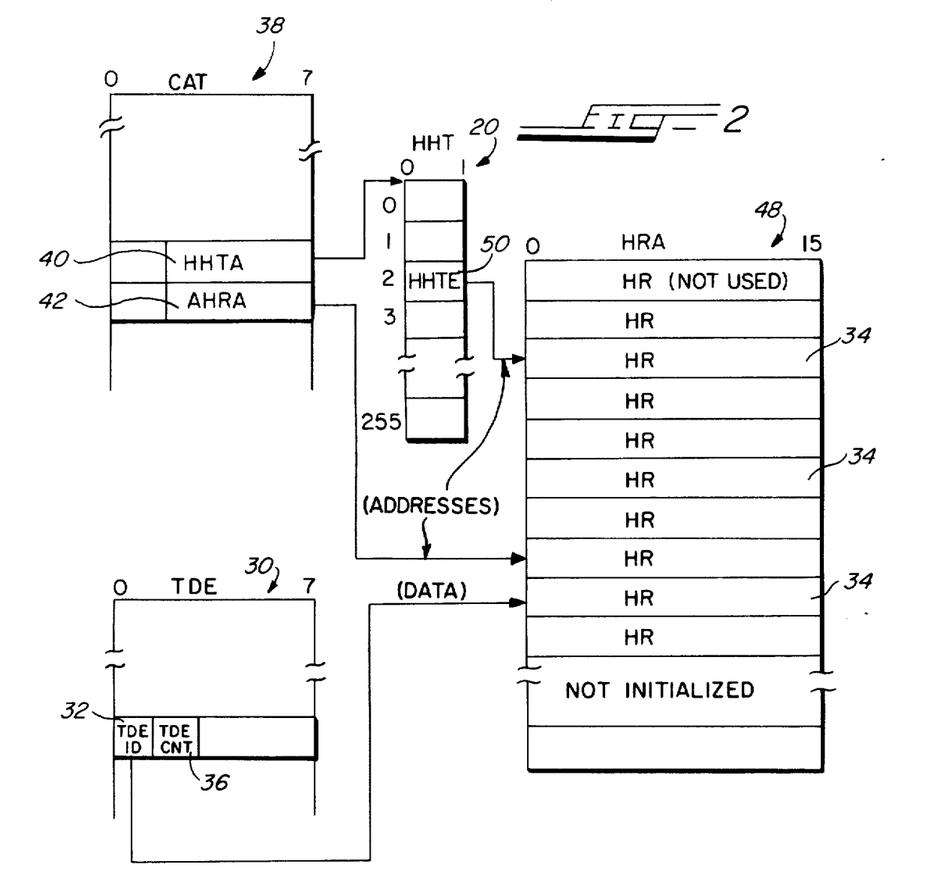
FIG. 2 is a schematic diagram illustrating the present invention.

With reference to FIG. 2, a task dispatching element (TDE) 30, which uniquely identifies a task 12, contains two fields utilized by the Grant/Free apparatus. The first TDE field is a unique task identifier (TDEID) 32 which is copied into each hold record 34 created by the task 12. It is used by the Free Hold function performed by the Grant/Free apparatus to ensure that any hold record 34 freed by a task 12 was created by the same task 12. The second TDE field is a count (TDECNT) 36 of all hold records 34 created by the task 12. TDECNT 36 is used when the task 12 is destroyed in order to assure the removal of all hold records 34 created by the task 12, and to avoid a search for additional hold records 34 after all the created hold records 34 have been removed.

All hold records 34, whether they logically are on a particular utilized hold record chain 22 for the hash synonym group or on the available hold record chain 24, are in reality contained within the single hold record area (HRA) 48. Although the hold records 34 on a given hold record chain 22 or the available hold record chain 24 appear to be contiguous, they need not be contiguous. The hold records 34 are made to appear contiguous by the manipulation of the address of the next hold record 34 within the hold record chains 22 and 24, and HHTE 50 for utilized hold record chains 22, or AHRA 42 for available hold record chains 24. The address of the next hold record 34 on the hold record chain 22 or 24 is contained within each hold record 34 as hereinafter described.

Figure 3:
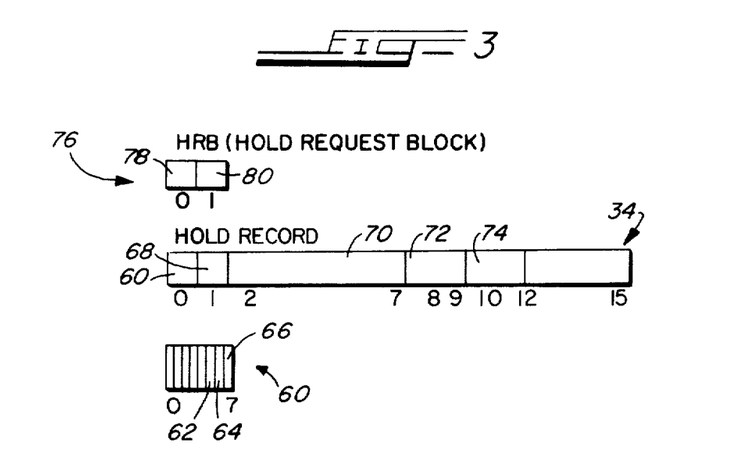
FIG. 3 is a diagram illustrating the format of the hold request block and hold record in accordance with the present invention.

The format of the 16-byte hold record 34 is shown in FIG. 3. Byte 0 contains HR Flags 60 which includes five unused bits (0–4), followed by three flag bits (5–7). Bit 5 is a busy flag (HR Busy) 62 which can be set on or off in the first hold record 34 in any hold record chain 22 to prevent another task from conducting operations on the hold record chain 22. Bit 6 is an end of chain flag (HR EOC) 64 which is turned on in the last hold record 34 in each hold record chain 22. Bit 7 is a monitor flag (HR Monitor) 66 used to notify the programming system when the particular monitored hold record 34 is freed.

Byte 1 of hold record 34 contains a hold code (HR Hold) 68 indicating the exact form of the particular hold to be enforced. Bytes 2–7 contain the object address (HR Object Addr) 70 of the object to which hold record 34 is applicable. HR Object Addr 70 must be compared with object address 14 to determine whether the hold record 34 on hold record chain 22 is applicable to object address 14 or the hash synonyms of object address 14. Bytes 8–9 contain the task identifier (HR TDE) 72 which is loaded from the TDEID 32 field in TDE 30 when the hold record 34 is created. Bytes 10-11 contain the address (HR Chain) 74 of the next hold record 34 in the hold record chain 22 or available hold record chain 24. Bytes 12-15 are not used.

FIG. 3 also shows the format of a 2-byte hold request block (HRB) 76 which is used by the Grant/Free apparatus as hereinafter described. Byte 0 contains the bit code HRBTEST 78 used in the Grant/Free apparatus to indicate the hold types to be tested. These hold types are not necessarily the same as the hold to be granted or freed. For example, the seize and lock protocols of the present invention would test for a LENR lock prior to granting a LSRD lock. Byte 1 contains HRBHOLD 80 which is the actual hold type to be granted or freed. HR Hold 68 in hold record 34 is loaded with HRBHOLD 80 when a hold is granted.

With reference to FIGS. 1, 2, and 3, a hold record control operation comprises three internal functions performed by the Grant/Free apparatus: manipulation of the chain busy flag (the "Set/Reset Chain Busy" function); granting of requested holds on objects, (the "Grant Hold" function); and freeing of specified holds on objects (the "Free Hold" function).

The manipulation of the busy flag function comprises a Set/Reset Chain Busy function. A pre-specified object address register contains the 6-byte object address 14 of the object of interest. A pre-specified return hold record address register is loaded with the address of the first hold record 34 on the hold record chain 22, if the contents of HHTE 50 are not zero and the HR Busy flag 62 is in the expected state as described below. The object address 14 is hashed in hash generator 16 to a 1-byte hashed address or hash index 18 which is used as an index into HHT 20. The address HHTA 40 to HHT 20 is found in CAT 38. HHT 20 contains a list of 2-byte addresses HHTE 50, each of which is either zero or the rightmost two bytes of the 6-byte address of the first hold record 34 in the hold record chain 22 for the object address 14 and its hash synonyms. The 2-byte address HHTE 50 references a hold record chain 22 in HRA 48. Since all hold records 34 in the HRA 48 are defined to be in a storage area such that the leftmost four bytes of their 6-byte addresses are common, the leftmost four bytes of the hold record address can be obtained from the available hold record address AHRA 42 maintained in the CAT 38. This allows HHTE 50 and HR Chain 74 addresses to be abbreviated to only the rightmost two bytes. If HHTE 50 in HHT 20 is zero, the hold record chain 22 contains no hold records 34, an end of chain latch is turned ON, the contents of the pre-specified return hold record address register is unchanged, and the Set/Reset Chain Busy function is completed.

If the content of HHTE 50 in HHT 20 is not zero, the first hold record 34 in the hold record chain 22 addressed by the HHTE 50 is fetched and HR Busy flag 62 is checked. For the Set Chain Busy function, if the hold record chain 22 is found to be already busy; i.e., if the HR Busy flag 62 is ON, a busy latch is turned ON. Similarly, for the Reset Chain Busy function, if the HR Busy flag 62 is already OFF, a busy latch is turned ON. In either of these two cases, if the end of chain latch is ON or the busy latch is ON, the contents of the pre-specified return hold record address register is unchanged. If the busy latch is OFF then the state of the HR Busy flag 62 is reversed and HR Object Addr 70 of the first hold record 34 in the chain 22 is returned by loading it into the prespecified return hold record address register.

The second internal function performed by the Grant/Free apparatus is Grant Hold. The possible outcomes of the Grant Hold function are a successful granting of the desired hold, an indication through an exception that no more available hold records exist, or a finding that a hold conflict exists. A pre-specified object address register contains the object address 14 for the object of interest. This object address 14 is hashed and the first hold record 34 on the hold record chain 22 is accessed as in the Set/Reset Chain Busy function. A second pre-specified register contains the 2-byte HRB 76 field. A third pre-specified return hold record address register is loaded with the address of a hold record 34 regardless of whether the hold is granted or a hold conflict is found to exist.

If HHTE 50 is zero, a new hold record 34 is created (with its HR EOC flag 64 ON) as described below, and placed on a hold record chain 22 for the object (not shown). TDECNT 36 in TDE 30 is incremented by one, and the address of the created hold record 34 is loaded into the return hold record address register. If HHTE 50 addresses a hold record chain 22, each hold record in the hold record chain 22 is accessed one by one. If the first hold record 34 has its HR Busy flag 62 ON, a busy latch is turned ON, the return hold record address register is not changed, and the Grant Hold function is completed. Otherwise, each hold record is checked to see whether the contents of the prespecified object address register matches the HR Object Addr 70 in hold record 34, and whether HRBTEST 78 has any bits ON in common with the HR Hold field 68 (indicating a potential hold conflict). If common bits are found to be ON, the TDEID field 32 of the TDE 30 is compared to the HR TDE field 72 in the hold record 34, and, if these match, the potential conflict is ignored. Otherwise, a true conflict has arisen. If the entire chain contains no conflicting holds for the object, a new hold record is created as described below and chained onto the front of the chain similar to the null chain case (except the HR EOG flag 64 is left OFF in this case). If a conflict is found for the object, a conflict latch is turned ON, the return hold record address register is loaded with the address of the hold record in conflict, and the Grant Hold function has been completed.

In all cases where no conflict is found and the desired hold is to be granted, HRBHOLD 80 of HRB 76 is checked for an all zero (null hold) indication. If HRBHOLD 80 is all zero, no actual hold record is created and the Grant Hold function is completed. Otherwise, the new hold record is created by fetching the first available hold record 34 in the available hold record chain 24 and, if the HR EOC flag 64 is OFF, by updating the HR Hold 68, HR Object Addr 70, HR TDE 72, HR Chain 74, and (if appropriate) the HR EOC flag 64. The new hold record is then chained to the first position in the chain. If the fetched available hold record 34 had its HR EOC flag 64 ON, indicating that it is the last one in the available hold record chain 24, the new hold record 34 is not created and put on the chain. Rather, a storage limit exceeded exception is signalled via the storage limit exceeded latch to permit initialization of additional available hold records 34 or initiating corrective action if no more hold records 34 can be initialized.

The third internal function performed by the Grant/Free apparatus is Free Hold. The possible outcomes of the Free Hold function are to free the described hold, to indicate whether the hold record to be freed is monitored, or to indicate that no matching hold can be found. The three pre-specified registers are the same as described for the Grant Hold function except that the return hold record address register is loaded with the address of the hold record to be freed if its HR Monitor flag 66 is ON.

If the chain is empty or busy, no matching hold can be found, the end of chain latch or busy latch, respectively, is turned ON and the return address register is not changed. Otherwise, each hold record 34 on the hold record chain 22 is compared for exact matches in HR Object Addr 70, HR Hold 68, and HR TDE 72. The first hold record 34 on the available hold record chain 22 which matches on all three of the above is a candidate to be removed from the hold record chain 22. First, the HR Monitor flag 66 is checked and if ON, the address of the candidate hold record is loaded into the return hold record address register, the hold record chain 22 is put into the busy state by turning HR Busy flag 62 ON in the first hold record 34 of the hold record chain 22, and the monitor latch is turned ON. If HR Monitor flag 66 is OFF, the hold record 34 is removed from the hold record chain 22 and returned to the available hold record chain 24. If no hold record 34 in the hold record chain 22 is found to match the object address, then a "lock does not exist latch", described below, is turned ON signalling a lock does not exist exception, and the return hold record address register is not changed.

Figure 4:
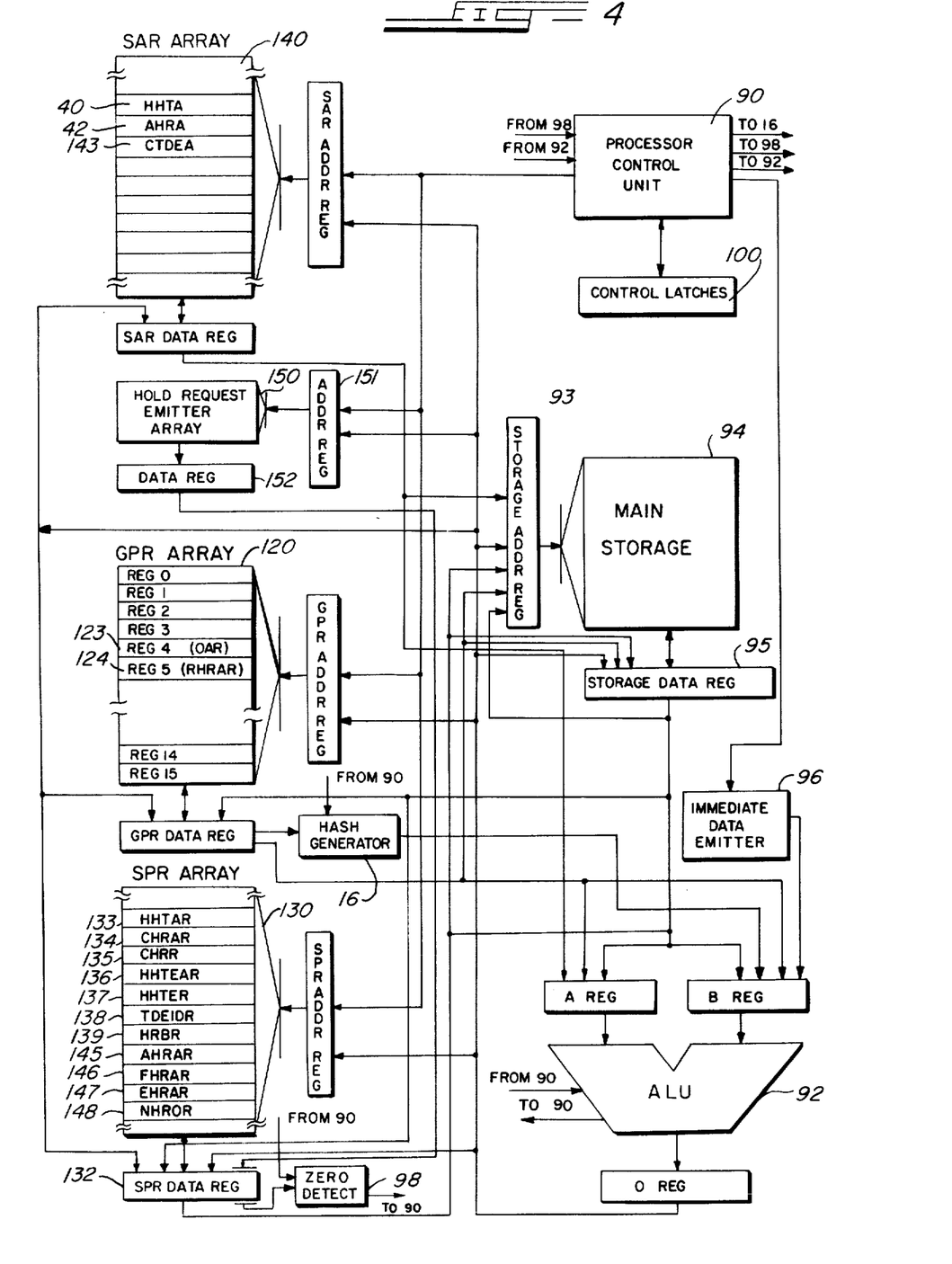
FIG. 4 is a block diagram of a data processing system embodying the present invention.
Figure 5:
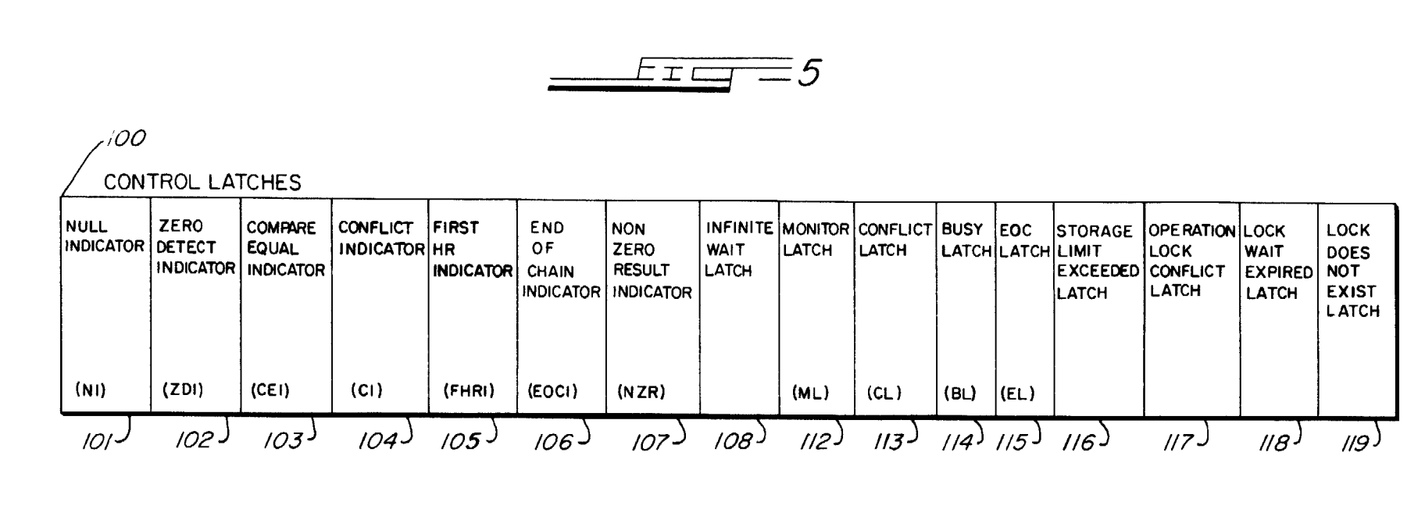
FIG. 5 is a diagram illustrating the relevant control latches in accordance with the present invention.

FIG. 4 shows the data flow for a preferred embodiment of this invention. A processor control unit (PCU) 90 is the control center for sequencing, register selection, and immediate data emission for the data flow. PCU 90 samples control latches 100, and the relevant control latches are shown in FIG. 5. The manner in which PCU 90 generates control signals is well known to those skilled in the art and does not comprise part of the present invention. In addition to PCU 90, there is a conventional arithmetic and logic unit (ALU) 92. A main storage unit 94 is shown, as are three register arrays 120, 130, 140, and a hold request emitter array 150. Each of these latter five units is addressed in a conventional manner by way of an address register. Each of the units except the hold request emitter array 150 transfers its contents bi-directionally by way of data registers. The gating of array addresses into the respective address registers to select the desired register contents is well known and generally omitted from this description.

The storage address register (SAR) array 140 and general purpose register (GPR) array 120 are ordinary read write register arrays in which each register is the same length. The CAT 38 previously described, see FIGS. 1 and 2, is included as part of the SAR array 140 for this particular embodiment. The special purpose register (SPR) array 130 is slightly different in that its registers may be logically different lengths. One skilled in the art can appreciate the steps necessary to address and transfer multiple small (e.g., 2-byte) sections to implement registers of any (even) number of bytes.

Figure 6:
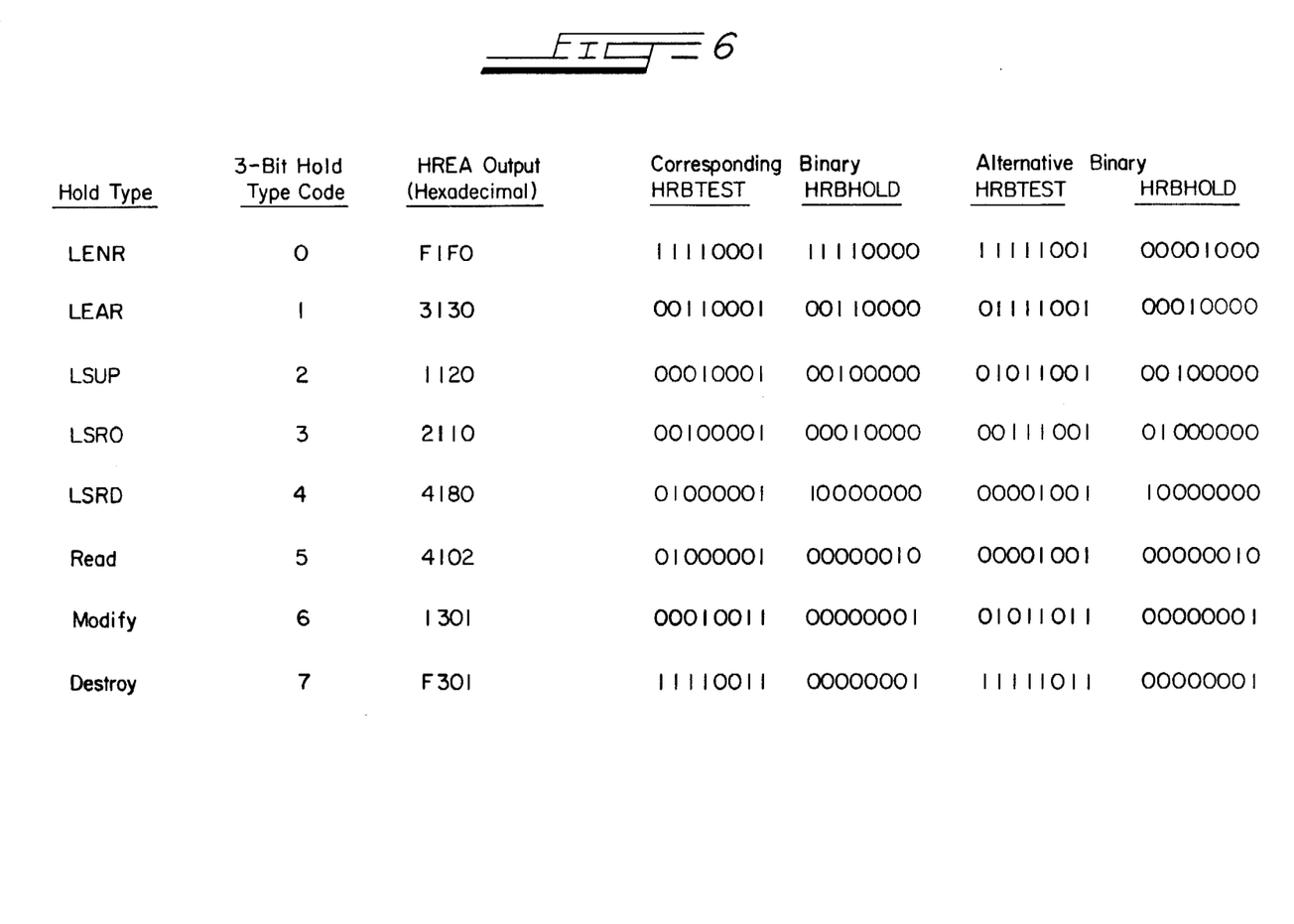
FIG. 6 is a table which shows the 3-bit hold type code, the associated HREA output, the corresponding binary configurations for HRBTEST and HRBHOLD, and a sample of an alternative binary configuration for HRBTEST and HRBHOLD which can be used to effect access protocols in accordance with the present invention.

An immediate data emitter 96 under direct control of PCU 90 transfers selectable constants to the right side of ALU 92. A 2-byte zero detect unit 98 is provided on the rightmost two bytes of the SPR data register 132. Zero detect unit 98 sets a zero detect indicator in control latches 100 when it is enabled by PCU 90 and detects an all zero rightmost 2-byte field in SPR data register 132. The hash generator 16 performs a hashing algorithm on a 6-byte object address (e.g., exclusive OR all six of the bytes together) to produce a 1-byte hash index 18. The hold request emitter array 150 is a read only memory of predetermined data constants for the system. An appropriate single 2-byte data constant as shown in FIG. 6 for a specific lock or seize action is selected by a 3-bit hold type code being gated to its address register.

This invention uses an exception handling mechanism (see discussion of exception latches 116-119, shown in FIG. 5) to signal the PCU 90 that an exception case has arisen. The PCU 90 then interrupts the normal sequence of events for the functions described in this invention and presents the exception to an exception handling mechanism which is common to most computer systems and is thus not described in this invention.

Any instruction which calls for an object to be read, modified, destroyed, or locked initiates a seize or lock function. The data processing system is initialized with all hold records 34 chained on the available hold record chain 24 and all HHTE's 50 in HHT 20 set to zero. Furthermore, all latches and indicators of the control latches 100 are turned OFF at the initiation of each machine instruction in any task. The status of the control latches 100, and of all registers, is maintained independently for each task as described in the co-pending application entitled "Task Handling Apparatus for a Computer System", Ser. No. 813,901 filed on July 8, 1977, which is assigned to the same assignee as the present invention.

The machine instruction causes PCU 90 to gate the 6-byte object address 14 of the object to be held (the "operand") into the pre-specified object address register (OAR) 123 in the GPR array 120. The 3-bit hold type code, which corresponds to the operation being conducted, is gated by PCU 90 to the hold request emitter array address register (HREA AR) 151. This selects a 2-byte output from hold request emitter array (HREA) 150 corresponding to the hold type code which is gated by PCU 90 through hold request emitter array data register (HREA DR) 152. The HREA 150 output values can be selected in accordance with the values shown in FIG. 6, although other values may also be used, as will be described below. The HREA output is gated by PCU 90 into the hold record block register (HRBR) 139 of SPR array 130. The Grant Hold function of the Grant/Free apparatus is then signalled.

With reference to FIGS. 1-5 there is shown an implementation of the Grant Hold function of the Grant/Free apparatus. When the sequencing of a Grant Hold function is signalled, control signals are generated in PCU 90 which cause the appropriate hold record chain 22 to be searched for a conflict before granting the newly requested hold.

The HHT 20 address HHTA 40 is gated from the SAR array 140 to hash hold table address register (HHTAR) 133 in special purpose register (SPR) array 130. The OAR 123 in GPR array 120 is fetched and gated to the hash generator 16. The hash generator 16 generates a 1-byte hash index 18 to an HHTE 50 in HHT 20 (shown in FIGS. 1 and 2) in main store 94. The 1-byte hash index 18 is gated to the right side of ALU 92. The HHTAR 133 is gated to the left side of ALU 92. An ADD operation is performed by ALU 92 and the sum is gated to storage address register (SAR) 93 and to the hold hash table entry address register (HHTEAR) 136 in SPR array 130. Next the address in SAR 93 is used to fetch HHTE 50 for the object address 14 from main store 94. The 2-byte HHTE 50 is gated to the rightmost two bytes of current hold record address register (CHRAR) 134 and to the hold has table entry register (HHTER) 137 in SPR array 130. It is at this time that HHTE 50 is checked in SPR data register 132 for all zeros via zero detect hardware 98. If HHTE 50 is zero (indicating an empty hold record chain 22), the zero detect indicator 102 is set ON and sequencing proceeds to the granting of a hold record 34 as hereinafter described.

If HHTE 50 is not zero, the leftmost four bytes of AHRA 42 in SAR array 140 are gated to the leftmost four bytes of CHRAR 134. The address in CHRAR 134 is gated from SPR array 130 to SAR 93 and this address is used to fetch the first hold record 34 on the hold record chain 22 (shown in FIGS. 1 and 2) from main store 94. The 16-byte hold record 34 fetched is gated to the current hold record register (CHRR) 135 in SPR array 130. At this time the first hold record 34 is checked to determine if the HR Busy flag 62 is ON, and if it is, the busy latch 114 (shown in FIG. 5) is turned ON and the granting of the seize or lock resumes. If the hold record chain 22 HR Busy flag 62 is OFF, the current TDE address (CTDEA) 143 in SAR array 140 is gated to the left side of ALU 92, and the immediate data output of immediate data emitter 96 is gated to the right side of ALU 92. This immediate data output increments CTDEA 143 to point at the TDEID 32 field within TDE 30. An ADD operation is performed by ALU 92 and the sum is gated to SAR 93. The address in SAR 93 is used to fetch the TDEID 32 in TDE 30 from main store 94. The 2-byte TDEID 32 is gated to the TDEID register TDEIDR 138 in SPR array 130.

The hold record 34 is checked for conflict with the type of hold being requested as follows. In step 1, HR Object Addr 70 in CHRR 135 in SPR array 130 is gated to the left side of ALU 92, and the object address 14 contained in OAR 123 in GPR array 120 is gated to the right side of ALU 92. A COMPARE operation is performed by ALU 92 and the compare equal indicator 103 (shown in FIG. 5) is set ON if the two object addresses compare equal. Otherwise, compare equal indicator 103 is set OFF. If the compare equal indicator 103 is ON, then sequencing proceeds to step 2. Otherwise, sequencing proceeds to step 4.

In step 2, HR Hold 68 in CHRR 135 is gated to the left side of ALU 92 and HRBTEST 78 in HRBR 139 is gated to the right side of ALU 92. An AND operation is performed by ALU 92. If there are any corresponding bits ON in HR HOLD 68 and HRBTEST 78 (i.e., the result is no zero) the conflict indicator 104 is set ON and sequencing proceeds to step 3. Otherwise, sequencing proceeds to step 4.

In step 3, HR TDE 72 in CHRR 135 is gated to the left side of ALU 92 and the current TDEID 32 in TDEIDR 138 is gated to the right side of ALU 92. A COMPARE operation is performed by ALU 92, and the compare equal indicator 103 is set ON if the two inputs to ALU 92 are equal. Otherwise, compare equal indicator 103 is set OFF. If the compare equal indicator 103 is ON, then a conflict has not occurred, and sequencing proceeds to step 4. Otherwise, a true conflict has occurred, and, to complete the function, the address in CHRAR 134 of the hold record 34 in conflict is gated to the return hold record address register (RHRAR) 124 in GPR array 120, the conflict latch 113 is turned ON, and the Grant Hold function is then completed.

In step 4, HR Flags 60 in CHRR 135 is gated to the left side of ALU 92, and a hexadecimal value of '02' is gated from immediate data emitter 96 to the right side of ALU 92. An AND operation is performed by ALU 92, and the null indicator 101 is set ON if the HR EOC flag 64 is OFF. If the null indicator 101 is OFF; i.e., HR EOC flag 64 was ON, sequencing proceeds to the granting of a hold record 34, as hereinafter described. Otherwise, the next hold record 34 in the hold record chain 22 is checked. HR Chain 74 in CHRR 135 is gated to the rightmost two bytes in CHRAR 134. CHRAR 134 is then gated to SAR 93 and used to fetch the next hold record 34 on the hold record chain 22. The fetched hold record 34 is gated to CHRR 135 so that it may be checked for a conflict. Every hold record 34 on the hold record chain 22 is checked as described in steps 1-4 above until a conflict is found or the end of the hold record chain 22 is reached.

If no conflicting hold record 34 is found, or if the hold record chain 22 is empty, the hold is granted by creating a hold record 34 as follows. HRBHOLD 80 in HRBR 139 is gated to the left side of ALU 92, and a hexadecimal value of '00' is gated from immediate data emitter 96 to the right side of ALU 92. A COMPARE operation is performed by ALU 92, and the null indicator 101 is set ON if the result is zero (i.e., HRBHOLD 80 is zero). Otherwise, the null indicator 101 is set OFF. If the null indicator 101 is ON, the Grant Hold function is complete. This feature allows a hold record chain 22 to be searched for specified conflicts even where no new lock on the object is desired.

If the null indicator 101 is set OFF, AHRA 42 is gated to the AHRA register (AHRAR) 145 and to CHRAR 134. AHRAR 145 is gated to SAR 93 and used to fetch an available hold record 34 from main store 94. The available hold record 34 is gated to CHRR 135. At this time the available hold record 34 is checked to see if its HR EOC flag 64 is ON, indicating that it is the last available hold record 34 on the available hold record chain 24. If HR EOC flag 64 is ON, the storage limit exceeded latch 116 is turned ON thereby signalling a storage limit exceeded exception. If not, HR Chain 74 of CHRR 135 is gated to bytes 5 and 6 of AHRAR 145 to point to the next available hold record 34 in HRA 48. AHRAR 145 is gated to AHRA 42 in SAR array 140. The new hold code, HRBHOLD 80 in HRBR 139, is then gated to HR Hold 68 in CHRR 135. The object address 14 in OAR 123 is gated to HR Object Addr 70 in CHRR 135. The new TDEID 32 in TDEIDR 138 is gated to HR TDE 72 in CHRR 135. If zero detect indicator 102 is set ON, a hexadecimal value of '02' is gated from immediate data emitter 96 through ALU 92 to HR flags 60 in CHRR 135, in order to flag the hold record just created as being the end of chain. HHTEAR 136 is gated to SAR 93 and the address in SAR 93 is used to store the rightmost two bytes of CHRAR 134 into main store 94. This updates HHTE 50 in main store 94 to point to new first hold record 34 in hold record chain 22. The new HR chain address HHTER 137 is gated to HR Chain 74 in CHRR 135. CHRAR 134 is gated to SAR 93 and is used to store CHRR 135 in main store 94. TDECNT 36 is then incremented by 1 as follows. The CTDEA 143 is gated by PCU 90 from SAR array 140 to the left side of ALU 92, and the appropriate offset is gated from immediate data emitter 96 to the right side of ALU 92. An ADD operation is performed by ALU 92 and the result is gated to SAR 93. This increments the address to point to the TDECNT 36 field within TDE 30. The address in SAR 93 is used to fetch the TDECNT 36 from main store 94. The 2-byte TDECNT 36 is gated to the left side of ALU 92, and an immediate hexadecimal value of '01' is gated from immediate data emitter 96 to the right side of ALU 92. An ADD operation is performed by ALU 92, and the result is gated to main store 94. CHRAR 134 is gated to the RHRAR 124 in CPR array 120 to save the address of the newly created hold record 34. Sequencing of the Grant Hold function is then complete.

To complete the seize or lock function, the state of control latches 100 is then checked. If the conflicting hold record latch 113 and the chain busy latch 113 and the chain busy latch 114 are both in the OFF state (See FIG. 5), then the requested lock or seize has been obtained. If the requested hold was a seize, sequencing can proceed with the machine instruction operation which initiated the seize. If the machine instruction was a request for a lock, the lock has been granted, and the operation of the machine instruction is complete. If the chain busy latch 114 is ON, the relevant hold record chain 22 is in use, and the Grant Hold function must be retried as described above.

If the conflicting hold record latch 113 is ON, the requested hold could not be granted because of a preexisting conflicting lock or seize. RHRAR 124 in GPR array 120 is then gated into the left side of ALU 92. A hexadecimal value '01' is gated from immediate data emitter 96 to the right side of ALU 92. ALU 92 performs an ADD operation and the result is gated to SAR 93. The addressed byte (HR Hold 68) is fetched from main storage 94 and is then gated to the left side of ALU 92. The first byte (HRBTEST 78) of HRBR 139 in the SPR array 130 is gated to the right side of ALU 92. ALU 92 performs an AND operation and the result is gated to the left side of ALU 92. An immediate hexadecimal value of 'F8' is gated from immediate data emitter 96 to the right side of ALU 92. ALU 92 performs an AND operation. Control latch NZR 107 is turned OFF if the result of the AND operation is zero and ON if the result is not zero.

It can be seen by comparing the HRBTEST column with the HRBHOLD column in FIG. 6 for the corresponding binary values of the HREA output, that, if the conflict was caused by an existing hold, the AND operation on the first byte (HRBTEST) of HRBR 139 and the HRBHOLD byte of the conflicting hold record fetched from main storage 94 will yield "1" in at least one of the first five bits of the result. On the other hand, if the conflict was caused by an existing seize, there will be a "1" in one of the last two bits of the result of the AND operation. When this result is AND'ed with the hexadecimal value 'F8' (corresponding to the binary value 11111000), a zero value indicates that the conflict was caused by an existing seize. Since the seize function is only used for maintaining exclusive access during the execution of a single machine instruction, the existing seize which is preventing the granting of the requested seize will be released shortly.

If control latch NZR 107 is OFF, then infinite wait latch 108 is turned ON, and a wait sequence is initiated as described below, in order to cause the task requesting the hold to wait for the release of the conflicting hold. If control latch NZR 107 is ON, then the HRBHOLD 80 of HRBR 139 in SPR array 130 is gated to the left side of ALU 92. An immediate hexadecimal value of '03' is gated from immediate data emitter 96 into the right side of ALU 92. ALU 92 then performs an AND operation. Control latch NZR 107 is turned OFF if the result of the AND operation is zero, and ON if the result is not zero.

If control latch NZR 107 is ON, this indicates that a requested seize cannot be granted because of an existing lock. This can be seen by comparing the immediate data hexadecimal value of '03' (00000011 in binary) with the values listed in the HRBHOLD column for binary digits corresponding to the HREA output shown in FIG. 6. Since the existing lock may be of indefinite duration, the rejected seize is not put into a wait, and an operation lock conflict exception is signalled via operation lock conflict latch 117.

If, on the other hand, control latch NZR 107 is OFF, this indicates that the requesting hold is a lock, and the requesting lock will be put into a timed wait state, the duration of which can be designated by the user requesting the lock. This is accomplished by turning the infinite wait latch 108 OFF.

The wait sequence is then initiated as follows. The contents of RHRAR 124 in GPR array 120 is gated to SAR 93. The addressed byte is fetched from main storage 94 and loaded into the left side of ALU 92. An immediate data hexadecimal value of '01' (00000001 in binary) is gated from immediate data emitter 96 to the right side of ALU 92. ALU 92 performs an OR operation, and the 1-byte result is gated through main storage data register 95 into main storage 94. This operation sets the HR Monitor flag 66 in the conflicting hold record 34 ON, so that, when the conflicting hold record 34 is released, the unsuccessful hold can be retried. This is accomplished by placing the task which was denied the requested hold into a wait queue utilizing the Send Message function described in the copending application entitled "Task Handling Apparatus for a Computer System", Ser. No. 813,901 filed on July 8, 1977, which is assigned to the same assignee as the present invention.

Again with reference to FIGS. 1 through 5, there is shown an implementation of the Set/Reset Chain Busy function, the Reset Chain Busy portion of which is invoked at this point. When the sequencing of the Set/Reset Chain Busy function is signalled, control signals are generated in PCU 90 which cause HHTA 40 to be gated from SAR array 140 to the HHT 20 address register (HHTAR) 133 in SPR array 130. The object address 14 contained in OAR 123 in GPR 120 is fetched and gated to hash generator 16. The hash generator 16 generates a 1-byte hash index 18 to be used as an index to HHTE 50 in HHT 20 in main storage 94. The 1-byte output of the hash generator 16 is gated to the right side of ALU 92. HHTAR 133 is gated to the left side of ALU 92. An ADD operation is performed by ALU 92, and the sum is gated to SAR 93. The address in SAR 93 is used to fetch HHTE 50 for the object address 14 from main store 94. The 2-byte HHTE 50 is checked for all zeros in the rightmost two bytes of SPR data register 132 by zero detect 98 and is gated to the rightmost two bytes of CHRAR 134 in SPR array 130. If HHTE 50 is all zeros (indicating an empty hold record chain 22), end of chain latch 115 is turned ON, and the Set/Reset Chain Busy function is completed.

Otherwise, the leftmost four bytes of AHRA 42 in SAR array 40 are gated into the leftmost four bytes of CHRAR 134. CHRAR 134 is then gated from SPR array 130 to SAR 93. The address in SAR 93 is used to fetch the first hold record 34 on the hold record chain 22 from main storage 94. The fetched 16-byte hold record 34 is gated to CHRR 135 in SPR array 130. For the Set Chain Busy sequence, the first hold record 34 on the hold record chain 22 is checked for HR Busy flag 62 being ON, and, if it is, the busy latch 114 is turned ON, and the Set Chain Busy function is completed. For the Reset Chain Busy function, if HR Busy flag 62 of the first hold record 34 on the hold record chain 22 is OFF, then the busy latch 114 is turned ON, and the Reset Chain Busy function is completed. On the other hand, if the HR Busy flag 62 was OFF for the Set Chain Busy function (or ON for the Reset Chain Busy function) the leftmost byte of the CHRR 135 is gated to the left side of ALU 92, and a hexadecimal value of '04' is gated from immediate data emitter 96 for Set Chain Busy (or a hexadecimal value of 'FB' for Reset Chain Busy) to the right side of ALU 92. An OR operation for Set Chain Busy (or an AND operation for Reset Chain Busy) is performed by ALU 92 causing HR Busy flag 62 to be turned ON for Set Chain Busy (or OFF for Reset Chain Busy). The results of the ALU operation are gated back into the leftmost byte of CHRR 135. To complete the Set/Reset Chain Busy function, CHRAR 134 is gated to SAR 93 and RHRAR 124 in GPR array 120. The address in SAR 93 is used to store the updated 16-byte hold record 34 from the CHRR 135 into main store 94. This completes the Set/Reset Chain Busy sequence.

At this point, if the infinite wait latch 108 is OFF, the task timer function is invoked. If the specified amount of time elapses, and the task which was previously denied a hold is still waiting, a lock wait expired exception is signalled via lock wait expired latch 118. The design and operation of the timer function is generally known in the art and does not comprise a part of the present invention. Otherwise, the waiting task is removed from the wait state by the release or unlock function described below, and the requested hold is retried as described above.

In sum, when the conflicting hold record latch 113 is turned ON, this indicates that the requested hold cannot be granted because of an existing hold on the object in question. The HRBTEST bits and HRBHOLD bits for both the requested and the conflicting holds are then compared with each other and with immediate data reference bits in order to ascertain whether the existing hold is a lock or a seize, and whether the requested hold is a lock or a seize. If the existing hold is a seize, the requesting task will be caused to wait, since the existing seize will be of short duration. If the existing hold is a lock, then the requested hold is checked to see whether the request is for a lock or a seize. If the requested hold is a seize, an operation lock conflict exception will be signalled, because it is impractical for a seize to wait for a lock. If, on the other hand, the requested hold is a lock, the task requesting the hold will be placed in a wait state for a predesignated amount of time. At the end of this time period a lock wait expired exception will be signaled via lock wait expired latch 118 if the lock still cannot be granted.

After a machine instruction (other than a grant lock) has been carried out, or when an unlock instruction is invoked, the release or unlock function must be signalled. In addition to releasing the hold, it is necessary to check whether any requested hold had been waiting for access to the object being released. This is accomplished by the Free Hold function. FIGS. 1 through 5 show an apparatus for performing the Free Hold function. The appropriate value for HRBR 139 and OAR 123 can be reloaded (if necessary) in the identical manner used to grant a lock or a seize as previously described. When the sequencing of a Free Hold function is signalled, control signals are generated in PCU 90 which cause the processor to gather search information, locate the target hold record, and free the target hold record, as follows.

In step A, AHRA 42 is gated from SAR array 140 to AHRAR 145. AHRAR 145 is gated to CHRAR 134 and to first hold record address register (FHRAR) 146 in SPR array 130. HHTA 40 is gated from SAR array 140 to HHTAR 133 in SPR array 130.

The object address contained in OAR 123 in GPR array 120 is gated to the hash generator 16. The 1-byte hash index 18 generated by the hash generator 16 is gated to the right side of the ALU 92. HHTAR 133 in SPR array 130 is gated to the left side of ALU 92 and the 1-byte hash index 18 is added to HHTA 40. The sum is gated both to HHTEAR 136 in SPR array 130 and to SAR 93. The address in SAR 93 is used to fetch HHTE 50 in main store 94. The 2-byte HHTE 50 is gated to the rightmost two bytes of CHRAR 134 and to the rightmost two bytes of FHRAR 146. This operation updates the addresses in CHRAR 134 and FHRAR 146 to point to the start of the hold record chain 22. HHTE 50 is then checked in the SPR data register 132 for a value of zero by the zero detect hardware 98. If HHTE 50 is zero, the end of chain latch 115 is turned ON, and sequencing of the Free Hold function is complete.

If HHTE 50 is not zero, the address in CHRAR 134 is gated to SAR 93, and the first hold record 34 on the hold record chain 22 is fetched from main store 94. The 16-byte hold record 34 which has been fetched is gated to CHRR 135. At this time the HR Busy flag 62 in CHRR 135 is checked, and, if ON, a busy latch 114 is turned ON, and sequencing of the Free Hold function is complete. If the HR Busy flag 62 is not ON, CTDEA 143 is gated from SAR array 140 to the left side of ALU 92, and an appropriate hexadecimal offset is gated from immediate data emitter 96 to the right side of ALU 92. An ADD operation is performed by ALU 92, and the sum is gated to SAR 93. This operation increments CTDEA 143 to point to the TDEID 32 field within the TDE 30. The address in SAR 93 is used to fetch the TDEID 32 from main store 94. The 2-byte TDEID 32 is gated to TDEIDR 138. The first hold record indicator 105 is turned ON to indicate that the first hold record 34 on the hold record chain 22 is being processed.

In step B of the Free Hold function, HR Object Addr 70 in CHRR 135 is gated to the left side of ALU 92, and the object address 14 contained in OAR 123 is gated to the right side of ALU 92 and a COMPARE operation is performed. If the addresses do not compare equal (i.e., the current hold record 34 is a synonym), the current hold record 34 is not the target hold record 34 and sequencing proceeds to step C. If the addresses compare equal, HR Hold 68 in CHRR 135 is gated to the left side of ALU 92 and HRBHOLD 80 in HRBR 139 is gated to the right side of ALU 92. A COMPARE operation is performed by ALU 92, and, if the holds are not the same (i.e., the current hold record 34 contains a hold that does not match the hold being freed), the current hold record 34 is not the target hold record and sequencing proceeds to step C.

If HR Hold 68 and HRBHOLD 80 compare equal, HR TDE 72 in CHRR 135 is gated to the left side of ALU 92 and TDEIDR 138 is gated to the right side of ALU 92. A COMPARE operation is performed and if they compare equal (i.e., the current TDE is the owner of the current hold record), the current hold record 34 is the target hold record and sequencing proceeds to step D below to free the target hold record.

In step C, HR EOC flag 64 in CHRR 135 is checked, and, if ON, the user is attempting to release a lock which does not exist and (since it was not found before reaching the end of the chain) a lock does not exist exception is signalled via lock does not exist latch 119. End of chain latch 115 is turned ON, and sequencing of the Free Hold function is complete.

If HR EOC flag 64 is OFF, CHRAR 134 is gated to the previous hold record address register (PHRAR) 147 in SPR array 130. HR Chain 74 in CHRR 135 is gated to the rightmost two bytes of CHRAR 134. The updated CHRAR 134 is gated to SAR 93. The address in SAR 93 is used to fetch the next hold record 34 on the hold record chain 22 which is gated to CHRR 135. The first hold record indicator 105 is reset OFF, and the operation described in step B to locate the target hold record is repeated.

In step D, the HR Monitor flag 66 in CHRR 135 is checked, and, if ON, the hold record 34 is not freed but is left on the hold record chain 22. FHRAR 146 is gated to SAR 93 to fetch the first hold record 34 on the hold record chain 22 which is gated into CHRR 135. HR Busy flag 62 in CHRR 135 is set ON. The address in SAR 93 is used to access the first hold record 34 on the hold record chain 22, and CHRR 135 is gated to main storage 94. The address in CHRAR 134 is gated to the RHRAR 124 in GPR array 120. The monitor latch 112 is set ON, and sequencing of the Free Hold function is complete.

If the HR Monitor flag 66 is OFF, the target hold record can be freed as follows. The HR EOC flag 64 in CHRR 135 is checked, and, if OFF, the end of chain indicator 106 is reset OFF. If the HR EOC flag 64 is ON, the end of chain indicator 106 is set ON. HR Flags 60 and HR TDE 72 in CHRR 135 are set OFF. This operation clears HR Flags 60 and HR TDE 72 in the current hold record 34. HR Chain 74 in CHRR 135 is gated to the next hold record offset register (NHROR) 148 in SPR array 130. The rightmost two bytes of AHRAR 145 are gated to HR Chain 74 in CHRR 135. The address in SAR 93 is loaded from CHRAR 134 and is used to access the current hold record 34 in the hold record chain 22, and CHRR 135 is gated to main storage 94. CHRAR 134 is gated to AHRA 42 in SAR array 140. This operation places the current hold record on the available hold record chain 24. The first hold record indicator 105 is checked, and, if ON, HHTEAR 136 is gated to SAR 93. The address in SAR 93 is used to access HHTE 50 for the hold record 34. The end of chain indicator 106 is checked, and, if ON, two bytes of zeros are gated to main storage 94. If end of chain indicator 106 is OFF, NHROR 148 is gated to main store 94. This operation removes the current hold record from the hold record chain 22 if the current hold record 34 was first on the chain.

If the first hold record indicator 105 is OFF, PHRAR 147 is gated to SAR 93 and used to fetch the previous hold record 34 on the hold record chain 22 from main storage 94. The hold record 34 is gated to CHRR 135. At this point, the end of chain indicator 106 is checked, and, if ON, HR EOC flag 64 in CHRR 135 is set ON, and HR Chain 74 is set to zero. If the end of chain indicator 106 is OFF, the HR EOC flag 64 is reset OFF, and NHROR 148 is gated to HR Chain 74 in CHRR 135. The address in SAR 93 is used to access the previous hold record 34 on the hold record chain 22, and CHRR 135 is gated to main store 94. This operation removes the current hold record 34 from the hold record chain 22 if it is not the first on the hold record chain 22.

TDECNT 36 is decremented by 1 as follows. The CTDEA 143 is gated by PCU 90 from SAR array 140 to the left side of ALU 92, and the appropriate offset is gated from immediate data emitter 96 to the right side of ALU 92. An ADD operation is performed by ALU 92, and the result is gated to SAR 93. This increments CTDEA 143 to point to the TDECNT 36 field within TDE 30. The address in SAR 93 is used to fetch the TDECNT 36 from main storage 94. The 2-byte TDECNT 36 is gated to the left side of ALU 92 and an immediate hexadecimal value of '01' is gated from immediate data emitter 96 to the right side of ALU 92. A SUBTRACT operation is performed by ALU 92, and the result is gated to main storage 94. The sequencing of the Free Hold function is then complete.

The release or unlock function is then completed as follows. If the chain busy latch 114 and the monitored hold record latch 112 are both OFF, the release or unlock has been completed, and the task can continue. If the chain busy latch 114 is ON, this indicates that the hold could not be freed because another task is using the relevant hold record chain, and the Free Hold function described above will have to be retried until the chain is no longer busy.

If the monitored hold record latch 112 is ON, then return hold record address register (RHRAR) 124 in GPR array 120 is gated to SAR 93 and causes one byte from main storage 94 to be gated to the left side of ALU 92. A hexadecimal value of 'FE' (11111110 in binary) is loaded into the right side of ALU 92 from immediate data emitter 96, and ALU 92 performs an AND operation. The result is gated into main storage 94. This turns the HR Monitor flag 66 OFF. The Reset Chain Busy function is then signalled. Since the monitored hold record latch 112 was ON, this indicates that the hold record was not freed during the previous pass. Therefore, the Free Hold function is now retired, after which the states of the end of chain latch 115, the chain busy latch 114, and monitored hold record latch 112 are again checked, and the operation continues as described above if any of the latches is ON. If none of these latches is ON, then the conflicting hold has been freed, any waiting tasks are removed from the wait state, and the granting of the requested holds can be tried again. The manner in which these tasks are removed from the wait state is described in copending application entitled "Task Handling Apparatus for a Computer System," Ser. No. 813,901 filed on July 8, 1977 and assigned to the same assignee as the present invention. The release or unlock function is then complete and sequencing can resume with the next machine instruction.

It should be noted that the HRBTEST bits and HRBHOLD bits depicted in FIG. 6 as corresponding to the HREA output comprise one example of bit configurations which embody the lock and seize conflict protocols described at the beginning of this application. In addition, when compared to the immediate data test bytes, these configurations readily permit determination of whether the requesting and conflicting holds are locks or seizes. An example of alternative HRBTEST bit and HRBHOLD bit configurations which perform the same function are also given in FIG. 6. These alternative bit configurations will function with the same immediate data reference bits as previously given. However, the primary configuration is preferred since two bits of both the test field and the hold field (the sixth and seventh bits) are unused, and are therefore available for other functions. Note that only the sixth bit in the alternative configuration is left unused. It should also be apparent that many alternative bit configurations are possible, which, when coupled with appropriate immediate data reference bits, can be used to implement the lock and seize protocols described above.

While the preferred embodiment of the invention has been illustrated and described, it is to be understood that the invention is not to be limited to the precise construction herein disclosed, and the right is reserved to all changes and modifications coming within the scope of the invention as defined in the appended claims.

We claim:

1. In a data processing system wherein tasks perform operations on objects, serialization apparatus for controlling access by a task to an object, comprising:
- access restricting means for generating an access restriction on an object, said access restriction being generated in behalf of a particular task;
- storage means for storing the access restriction on the object; and
- testing means for testing the compatability of a proposed operation on a given object with the access restriction on that object;
- whereby if the testing means determines that the proposed operation on the object is not compatible with the access restriction on that object, the data processing system will not permit the proposed operation to take place.

2. Serialization apparatus as claimed in claim 1 wherein said access restricting means is capable of generating an access restriction on an object, said access restriction being generated in favor of a first task, which access restriction provides the first task with a first specified level of guaranteed access to the object in order to perform specified types of operations on the object, thus precluding a second task from performing other specified types of operations on the object.

3. Serialization apparatus as claimed in claim 2, wherein
- the first level of guaranteed access is selected from among the class of: read access, modify access, and destroy access; and
- the second level of access is selected from among the class of: read access, modify access, and destroy access.

4. Serialization apparatus as claimed in claim 1 wherein the access restricting means further comprises:
- seize generating means for automatically generating an access restriction on an object.

5. Serialization apparatus as claimed in claim 4, wherein the seize generating means further comprises:
- shared seize generating means for generating an access restriction on an object in behalf of a first task, said access restriction preventing a second task from obtaining access to modify or destroy the object.

6. Serialization apparatus as claimed in claim 4, wherein the seize generating means further comprises:
- exclusive seize generating means for generating an access restriction on an object in behalf of a first task, said access restriction preventing a second task from obtaining any access to the object.

7. Serialization apparatus as recited in claim 4, wherein the seize generating means generates access restrictions which are released after a single machine instruction.

8. Serialization apparatus as claimed in claim 1, wherein the access restricting means further comprises:
- lock generating means for optionally generating an access restriction on an object in behalf of a particular task.

9. Serialization apparatus as recited in claim 8, wherein the lock generating means can generate plural non-conflicting access restrictions which can be created and released in any sequence at the user's discretion.

10. A serialization apparatus as claimed in claim 8 wherein said testing means tests the compatability of a proposed operation on a given object with the access restriction on that object regardless of whether or not the proposed operation explicitly requests a lock on that object.

11. Serialization apparatus as claimed in claim 1 wherein the access restricting means further comprises:
- exclusive seize generating means for generating an access restriction on an object in behalf of a first task, said access restriction preventing a second task from obtaining any access of the object;
- shared seize generating means for generating an access restriction on an object in behalf of a first task, said access restriction preventing a second task from obtaining access to modify or destroy the object; and
- lock generating means for optionally generating an access restriction on an object in behalf of a particular task.

12. Serialization apparatus as claimed in claim 11, wherein the lock generating means, the exclusive seize generating means, and the shared seize generating means further comprise:
- hold record means containing the hold restrictions on an object;
- hold record chain means for linking said hold record means;
- address means for addressing said hold record chain means applicable to the object;
- hold record control means for adding and removing said hold record means from said hold record chain means; and
- testing means for testing the compatability of a proposed access to the object with the hold restrictions on the object.

13. A serialization apparatus as claimed in claim 1, further comprising:
- wait means whereby when a proposed operation is not permitted to take place due to an existing access restriction on an object, the task proposing the operation will be caused to wait until the access restriction is released, whereupon the proposed operation will be automatically retried.

14. A serialization apparatus as claimed in claim 13 wherein said wait means further comprises a time limit control means whereby an exception will be signalled if the proposed operation is not permitted to take place within a preselected time interval.

15. A serialization apparatus as claimed in claim 1, wherein the testing means automatically enforces the access restriction.

16. A serialization apparatus as claimed in claim 1 wherein the task in behalf of which any access restriction is generated can be identified from the access restriction.

17. In a data processing system wherein tasks perform operations on objects, serialization apparatus for controlling access by a task to an object, comprising:
   hold record means containing hold restrictions on an object;
   hold record chain means for linking said hold record means;
   address means for addressing said hold record chain means applicable to the object;
   hold record control means for adding and removing said hold record means from said hold record chain means; and
   testing means for testing the compatability of a proposed access to the object with the hold restrictions on the object.

18. A serialization apparatus as claimed in claim 17, further comprising:
   busy indication means for indicating said hold record chain means as busy during operations on said hold record chain means.

19. A serialization apparatus as claimed in claim 17, further comprising:
   available chain means for linking available hold record means.

20. A serialization apparatus as claimed in claim 17, wherein said testing means comprises apparatus for comparing the hold restrictions contained in the hold record means for an object with the proposed access to the object.

21. A serialization apparatus as claimed in claim 17, wherein said address means comprises:
   hash hold table means containing the address of the first hold record means in said hold record chain means for the object;
   hash generator means for generating a hash index from the object address, the hash index addressing an entry in said hash hold table means; and
   chain address means contained in said hold record means for addressing the next hold record means in the hold record chain means.

22. In a data processing system including a memory wherein tasks perform operations on objects, serialization apparatus for controlling access by a task to an object, comprising:
   hold record means containing hold restrictions on an object, said hold record means being located in a substantially contiguous portion of the memory;
   hold record chain means for configuring selected ones of said hold record means into a chain, without regard to whether said selected ones of said hold record means are contiguous;
   address means for addressing said hold record chain means applicable to the object;
   hold record control means for adding and removing said hold record means from said hold record chain means; and
   testing means for testing the compatability of a proposed operation of an object with the hold restrictons on the object.

23. In a data processing system, serialization apparatus for controlling access by tasks to objects upon which such tasks execute user instructions and machine instructions comprising:
   access restricting means responsive to both user instructions and machine instructions for automatically granting to a first task a first specified level of access to a specified object, so that the granting of the first specified level of access to the first task precludes a second task from obtaining a second specified level of access to the object.

* * * * *